(12) United States Patent
Colibaba-Evulet

(10) Patent No.: US 7,416,583 B2
(45) Date of Patent: Aug. 26, 2008

(54) APPLIANCE HAVING A CONTAINER INCLUDING A NANOSTRUCTURED MATERIAL FOR HYDROGEN STORAGE

(75) Inventor: Andrei Colibaba-Evulet, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 643 days.

(21) Appl. No.: 10/689,398

(22) Filed: Oct. 17, 2003

(65) Prior Publication Data

US 2005/0092241 A1    May 5, 2005

(51) Int. Cl.
*C01B 3/02* (2006.01)
*D01F 9/12* (2006.01)

(52) U.S. Cl. .......................... 96/108; 502/526; 977/948
(58) Field of Classification Search .................... 96/108, 96/109, 113, 146; 502/526; 206/0.7; 429/13; 423/248, 648.1; 977/962, 742, 902, 948
See application file for complete search history.

(56) References Cited

U.S. PATENT DOCUMENTS

| | | | |
|---|---|---|---|
| 5,424,054 A | 6/1995 | Bethune et al. | |
| 5,543,378 A | 8/1996 | Wang | |
| 5,653,951 A | 8/1997 | Rodriguez et al. | |
| 5,817,157 A | 10/1998 | Checketts | |
| 5,851,507 A | 12/1998 | Pirzada et al. | |
| 5,965,267 A | 10/1999 | Nolan et al. | |
| 6,119,651 A | 9/2000 | Anderson | |
| 6,290,753 B1 | 9/2001 | Maeland et al. | |
| 6,309,449 B1 | 10/2001 | Klos et al. | |
| 6,350,488 B1 | 2/2002 | Lee et al. | |
| 6,368,406 B1 | 4/2002 | Deevi et al. | |
| 6,432,176 B1 | 8/2002 | Klos et al. | |
| 6,444,016 B2 * | 9/2002 | Oshima et al. ................. 96/111 |
| 6,602,932 B2 | 8/2003 | Feldheim et al. | |
| 6,802,876 B1 * | 10/2004 | Kobayashi et al. ......... 48/127.9 |
| 2002/0117123 A1 * | 8/2002 | Hussain et al. .................. 123/3 |
| 2003/0037551 A1 * | 2/2003 | Wolfe .......................... 62/46.3 |
| 2004/0016769 A1 * | 1/2004 | Redmond ....................... 222/3 |
| 2005/0077172 A1 * | 4/2005 | Wachi et al. .............. 204/228.5 |
| 2005/0229489 A1 * | 10/2005 | Bavarian et al. ........... 48/198.7 |

OTHER PUBLICATIONS

W. Teunissen et al., "The Structure of Carbon Encapsulated NiFe Nanoparticles", Journal of Catalysis, vol. 204, pp. 169-174, 2001.
C. Davis et al., "*Hydrogen Fuel Cell Vehicle Study*", pp. 1-38, Jun. 12, 2003.

(Continued)

*Primary Examiner*—Frank M Lawrence
(74) *Attorney, Agent, or Firm*—Francis T. Coppa

(57) ABSTRACT

An appliance that uses a substantially carbon-free hydrogen is disclosed. The appliance includes a converter, a hydrogen storage container including a carbon-based nanostructured material, a charger, a discharger and, optionally, a controller is disclosed. The hydrogen storage container is capable of storing the substantially carbon-free hydrogen in a condensed state. In addition to the carbon-based nanostructured material, the container may include a metal capable of acting as both a seed for the formation of the nanostructured material and a facilitator for promoting the storage in the condensed state of the substantially carbon-free gaseous hydrogen provided to the storage container.

33 Claims, 2 Drawing Sheets

OTHER PUBLICATIONS

L. Schlapbach et al., *"Hydrogen-Storage Materials for Mobile Applications"*, Macmillian Magazines Ltd.,, vol. 414, pp. 353-358, 2001.

DT Colbert, *"Single-Wall Nanotubes: A New Option for Conductive Plastics and Engineering Polymers"*, no date given.

S. Kumar et al., *Carbon Nanotubes: A Small-Scale Wonder*, reprinted from Chemical Engineering, Feb. 2003.

A. Lueking et al., *"Hydrogen Storage in Carbon Nanotubes: Residual Metal Content and Pretreatment Temperature"*, American Institute of Chemical Engineers, AIChE Journal, via ProQuest Information and Learning Company, pp. 1-13, 2003.

B. Bockrath, *"Hydrogen Storage on Carbon Nanotubes"*, Fuels and Process Chemistry Division, national Energy Technology Laboratory, no date given.

AC Dillon, *"Hydrogen Storage in Carbon Single-Wall Nanotubes"*, Proceedings of the 2002 U.S. DOE Hydrogen Program Review, NREL/CP-610-32405, National Renewable Energy Laboratory, Golden, CO 80401-3393, pp. 1-18, no date given.

J. Wang, *"Hydrogen Storage for Transportation Applications"*, Materials & Engineering Sciences Center, Atoms to Continuum, Presentation at Energy and Nanotechnology: Strategy for the Future Conference Center for Nanoscale Science and Technology, Rice University, Houston, TX, pp. 1-24, May 4, 2003.

*"Hydrogen Storage "Think Tank" Report"*, sponsored by the U.S. Department of Energy Office of Hydrogen, Fuel Cells and Infrastructure Technologies, pp. 1-11, Mar. 14, 2003.

Ovonic Hydrogen Solutions, *"We Help Fuel Imaginations"*, no date given.

F. Barbir, *"Review of Hydrogen Conversion Technologies"*, Clean Energy Research Institute, University of Miami, Coral Gables, FL 33124, USA, no date given.

TN Veziroglu, *"hydrogen Energy System: A Permanent Solution to Global Problems"*, Clean energy research Institute, University of Miami, Coral Gables, FL 33124, USA, no date given.

B. Viswanathan et al., *"Carbon Nanomaterials—Are They Appropriate Candidates for Hydrogen Storage?"*, Department of Chemistry, Indian Institute of Technology, Madras 600 036, no date given.

AC Dillon et al., *"Optimization of Single-Wall Nanotube Synthesis for Hydrogen Storage"*, National Renewable Energy Laboratory, Golden, CO 80401-3393 (USA, IEA Task 12: Metal Hydrides and Carbon for Hydrogen Storage 2001.

SM Lee et al., *"Novel Mechanism of Hydrogen Storage in Carbon Nanotubes"*, Journal of the Korean Physical Society, vol. 38, No. 6, pp. 686-691, Jun. 2001.

J. Li et al., *"Theoretical Evaluation of Hydrogen Storage Capacity in Pure Carbon Nanostructures"*, Journal of Chemical Physics, American Institute of Physics, vol. 119, No. 4, pp. 2376-2385, 2003.

AC Dillon et al., *"Carbon Nanotube Materials for Hydrogen Storage"*, Proceedings of the 1999 DOE/NREL Hydrogen Program Review, NREL/CP-570-26938, May 4-6, 1999.

B. Simard et al., *"Hydrogen Storage in Single-Walled Carbon Nanotubes"*, Foresight Institute, This is an abstract for a presenation given at the Ninth Foresight Conference on Molecular Nanotechnology, Mar. 10, 2003.

J. Ying, *"Nanostructure Processing of Advanced Catalytic Materials"*, Department of Chemical Engineering, Massachusetts Institute of Technology, Cambridge, MA 02139, pp. 1-4, Mar. 10, 2003.

BK Pradhan et al., *"large Cryogenic Storage of Hydrogen in Carbon Nanotubes at Low Pressures"*, Mat. Res. Soc. Symp. Proc., vol. 706 @ Materials Research Society, pp. Z10.3.1-Z10.3.6, 2002.

RB Schwarz, *"Storage of Hydrogen in Powders With Nanosized Crystalline Domains"*, Center for Materials Science, Mail Stop K765, Los Alamos National Laboratory, Los Alamos, NM 87545, pp. 1-3, Mar. 10, 2003.

DE Luzzi et al., *"Nanote CO2, Nanotechnology in Carbon and Related Materials"*, University of Sussex at Brighton, pp. 1-37, Aug. 28-31, 2002.

\* cited by examiner

APPLIANCE HAVING A CONTAINER INCLUDING A NANOSTRUCTURED MATERIAL FOR HYDROGEN STORAGE

BACKGROUND OF INVENTION

The present invention relates generally to an appliance using a hydrogen-based technology and, more particularly, to a hydrogen storage container and a carbon-based nanostructured material that facilitates the hydrogen storage.

Worldwide initiatives have been established to replace fossil fuel-based (e.g., petroleum, natural gas, and coal) technologies with hydrogen based technologies. The major byproduct of hydrogen-based technologies is water. Benefits of converting to hydrogen-based technologies include reduction in the emission into the atmosphere of greenhouse gases, ozone-depleting chemicals, acid rain ingredients, and pollution. These benefits would be increased by producing hydrogen using renewable energy sources (e.g., solar and wind technologies).

One major challenge with respect to converting to hydrogen-based technologies is the storage of hydrogen. Large-scale, safe, practical hydrogen storage systems have eluded development, especially for automobiles. Storing hydrogen as a liquid can be difficult because the hydrogen must be cooled to and kept at −423° Fahrenheit (−253° Celsius). Refrigerating hydrogen to this temperature (i.e., one pound (0.45 kg) of hydrogen requires 5 kWh of electrical energy and uses the equivalent of 25% to 30% of its energy content) and requires special materials and handling.

Storing hydrogen as a gas uses less energy than storing liquid hydrogen. To store any appreciable amount as a gas, hydrogen must be pressurized. For large-scale use, pressurized hydrogen gas could be stored in the same manner as natural gas in caverns, gas fields, and mines. The hydrogen gas could then be piped into individual distribution centers, homes, and businesses. Though this means of storage is feasible, the need for pressurized metal tanks for transporting and storing smaller useable quantities is very expensive and impractical.

Storing hydrogen as hydrides is a potentially more efficient method. Hydrides are chemical compounds of hydrogen and other materials. Research is currently being conducted on magnesium hydrides. Certain metal alloys such as magnesium nickel, magnesium copper, and iron titanium compounds absorb hydrogen and release it when heated. Hydrides, however, store little energy per unit weight. Current research aims to produce a compound that will carry a significant amount of hydrogen with a high energy density, release the hydrogen as a fuel, react quickly, and be cost effective.

Thus, there remains a need for a new and improved hydrogen storage container, including a material that facilitates the storage of hydrogen at a density, such that the quantity of stored hydrogen is sufficient to operate an associated appliance, while at the same time the hydrogen storage container having a size substantially the same as or even smaller than a storage container for a fossil fuel in a comparable fossil fuel based technology appliance.

BRIEF SUMMARY OF INVENTION

The present invention meets these and other needs by providing an appliance including a converter, a hydrogen storage container including a carbon-based nanostructured material, a charger, a discharger and, optionally, a controller. The converter is capable of using a substantially carbon-free hydrogen. The hydrogen storage container is capable of storing the substantially carbon-free hydrogen in a condensed state. In addition to the carbon-based nanostructured material, the container may include a metal capable of acting as both a seed for the formation of the nanostructured material and a facilitator for promoting the storage in the condensed state of the substantially carbon-free gaseous hydrogen provided to the storage container. The charger is capable of assisting with the storage, in a condensed state, of the substantially carbon-free gaseous hydrogen provided to the storage container. The discharger assisting with the liberation the condensed substantially carbon-free hydrogen from the nanostructured material of the hydrogen storage container so as to make gaseous hydrogen available for use in the converter. When included, the controller regulates the cooperation of the converter, the charger and the discharger so as to operate the appliance in a prescribed manner. Also, the appliance may include an exhaust for removing byproducts—mainly water.

The converter transforms the energy produced by the consumption of hydrogen to any of one of heat energy, mechanical energy, electrical energy, and combinations thereof. Thus, without limitation, it is contemplated that the converter may be any one of a propulsive system, power generation system, thermal management system, and combinations thereof. The propulsive system may include, without limitation, a combustion-based system such as, for example, an internal combustion engine or a turbine; a chemical-based system such as, for example, a fuel cell-based system; and combinations thereof. Similarly, the thermal management system may include, without limitation, a combustion-based system such as, for example, an internal combustion engine or a turbine; a chemical-based system such as, for example, a fuel cell-based system; and combinations thereof. The fuel cell-based system may be a hydrogen-oxygen electrical generator. Further, the thermal management system may include, without limitation, a heating system such as, for example, a combustion-based system or a hydrogen-oxygen electrical generator; a cooling system such as, for example, a direct cooling system that takes advantage of the excellent thermal conducting properties of hydrogen or a hydrogen-oxygen electrical generator that in turn powers a refrigeration system; and combinations thereof.

In an aspect, the appliance may further include a hydrogen gas supply communicating with the charger. Hydrogen of such a hydrogen gas supply may beneficially be produced using a renewable energy source such as, for example, a solar-based technology, a wind-based technology, a hydro-based technology, a geothermal-based technology, ocean energy-based technology (e.g., thermal, kinetic . . . etc.), biological-based technology, and combinations thereof.

As the charger is capable of assisting with the storage of the substantially carbon-free gaseous hydrogen in a condensed state, the charger may further include a conditioner for facilitating the charging the nanostructured material with hydrogen. The conditioner includes a mechanism for one of the conditioning (1) the gaseous hydrogen to a prescribed state such as, for example, temperature and pressures; (2) the nanostructured material to a prescribed state such as, for example, temperature and pressures; and (3) both (1) and (2). To that end, the conditioner may be any one of a cooler, a pressurizer, and a cooler and pressurizer. It is contemplated that the cooler is capable of conditioning over a broad range of temperatures (e.g., between about −50° C. and 15° C.). Also, it is contemplated that the pressurizer is capable of conditioning over a broad range of pressures, including subatomopheric, atmospheric, superatmospheric and hyperatmospheric (e.g., between about 20 torr and 1000 pounds per square inch absolute (psia)).

As the discharger assists with the liberation the condensed hydrogen from the nanostructured material to provide gaseous hydrogen to the converter, the discharger may further include a restoring mechanism capable of controllably releasing condensed hydrogen. As the condensed hydrogen is spatially distributed throughout the nanostructured material that in turn may be spatially distributed throughout the storage container, the restoring mechanism is capable of selectively communicating with the nanostructured materials to effect the transformation of condensed hydrogen to gaseous hydrogen in a manner that provides the gaseous hydrogen to the converter in a state (e.g., temperature and pressure) and a mass flow rate prescribed to permit the appliance to perform effectively. The restoring mechanism includes a heating mechanism that may provide heat by any one of chemical heating, resistive heating, radio frequency heating, microwave heating, electrical heating, electromagnetic heating, and combinations thereof. It is contemplated that the heating mechanism is capable of operating over a broad range of temperatures (e.g., between about 15° C. and 900° C.). The restoring mechanism may further include a subcontroller. Also, the restoring mechanism further may include at least one sensor such as, for example, any one of a temperature sensor, a pressure sensor, a partial pressure sensor, chemical sensor, and a flow sensor.

In a preferred embodiment, the carbon-based nanostructured material includes a metal capable of acting as both a seed for the formation of the nanostructured material and a facilitator for promoting the storage of hydrogen in the condensed state. The metal includes at least one transition metal. The metal may include non-stoichiometric transition metal combinations. Examples of a metal include any one of magnesium, titanium, iron, nickel, cobalt, mixtures thereof, alloys thereof, and combinations thereof. The characteristic metal particle has a size less than about 100 nanometers, and may be less than about 10 nanometers, and even less than one nanometer. In promoting the storage of hydrogen in the condensed state, the metal may promote any one of (1) the Van der Waals' bonding of the hydrogen to the nanostructured material to facilitate storage in a condensed state; (2) the covalent bonding of hydrogen to the nanostructured material to facilitate storage in a condensed state; and (3) the Van der Waals' bonding and the covalent bonding of hydrogen to the nanostructured material to facilitate storage in a condensed state.

Although any of the variety of carbon-based nanostructured materials is contemplated, a multiple-walled carbon nanotube may provide hydrogen storage capacity advantages. Among the variety of contemplated multiple-walled carbon nanotubes are any one of a zigzag structure, a chiral structure, an armchair structure and combinations thereof. Counterintuitive to providing hydrogen storage capacity advantages, it is believed that a single-walled carbon nanotube may provide increased hydrogen storage capacity over multiple-walled carbon nanotubes. Among the variety of contemplated single-walled carbon nanotubes are any one of a zigzag structure, a chiral structure, an armchair structure, and combinations thereof. Yet another contemplated carbon-based nanostructured material is a platelet structure carbon-based material. When metal nanoparticles are included, the carbon-based material may be a graphite encapsulated metal.

With respect to the reversible storage of hydrogen by the nanostructured material, it is desirable that it be capable of reversibly storing hydrogen up to at least about seven weight percent and up to about 14 weight percent.

Concerning the hydrogen storage container, in an embodiment, it is interchangeable. Among other characteristics, the container is pressurizeable. This characteristic is at any one of cryogenic temperatures, elevated temperatures, and cryogenic through elevated temperatures.

Accordingly, one aspect of the present invention is to provide an appliance including a converter, a hydrogen storage container including a carbon-based nanostructured material, a charger, and a discharger. The converter is capable of using a substantially carbon-free hydrogen. The hydrogen storage container is capable of storing the substantially carbon-free hydrogen in a condensed state. The carbon-based nanostructured material is capable of storing in a condensed state of the substantially carbon-free gaseous hydrogen provided to the storage container. The charger is capable of assisting with the storage, in a condensed state, of the substantially carbon-free gaseous hydrogen provided to the storage container. The discharger assists with the liberation the condensed substantially carbon-free hydrogen from the nanostructured material of the hydrogen storage container so as to make gaseous hydrogen available for use in the converter.

Another aspect of the present invention is to provide a hydrogen storage container useable in an appliance including a converter, a charger, and a discharger. The hydrogen storage container is capable of storing substantially carbon-free hydrogen in a condensed state. In addition to a carbon-based nanostructured material, the container includes a metal capable of acting as both a seed for the formation of the nanostructured material and a facilitator for promoting the storage in the condensed state of the substantially carbon-free gaseous hydrogen provided to the storage container.

Still another aspect of the present invention is to provide an appliance including a converter, a hydrogen storage container including a carbon-based nanostructured material, a charger, a discharger and a controller. The converter is capable of using a substantially carbon-free hydrogen. The hydrogen storage container is capable of storing the substantially carbon-free hydrogen in a condensed state. In addition to the carbon-based nanostructured material, the container includes a metal capable of acting as both a seed for the formation of the nanostructured material and a facilitator for promoting the storage in the condensed state of the substantially carbon-free gaseous hydrogen provided to the storage container. The charger is capable of assisting with the storage, in a condensed state, of the substantially carbon-free gaseous hydrogen provided to the storage container. The discharger assisting with the liberation the condensed substantially carbon-free hydrogen from the nanostructured material of the hydrogen storage container so as to make gaseous hydrogen available for use in the converter. The controller regulates the cooperation of the converter, the charger, and the discharger so as to operate the appliance in a prescribed manner.

These and other aspects, advantages, and salient features of the present invention will become apparent from the following detailed description, the accompanying drawings, and the appended claims.

DETAILED DESCRIPTION

Figure 1:
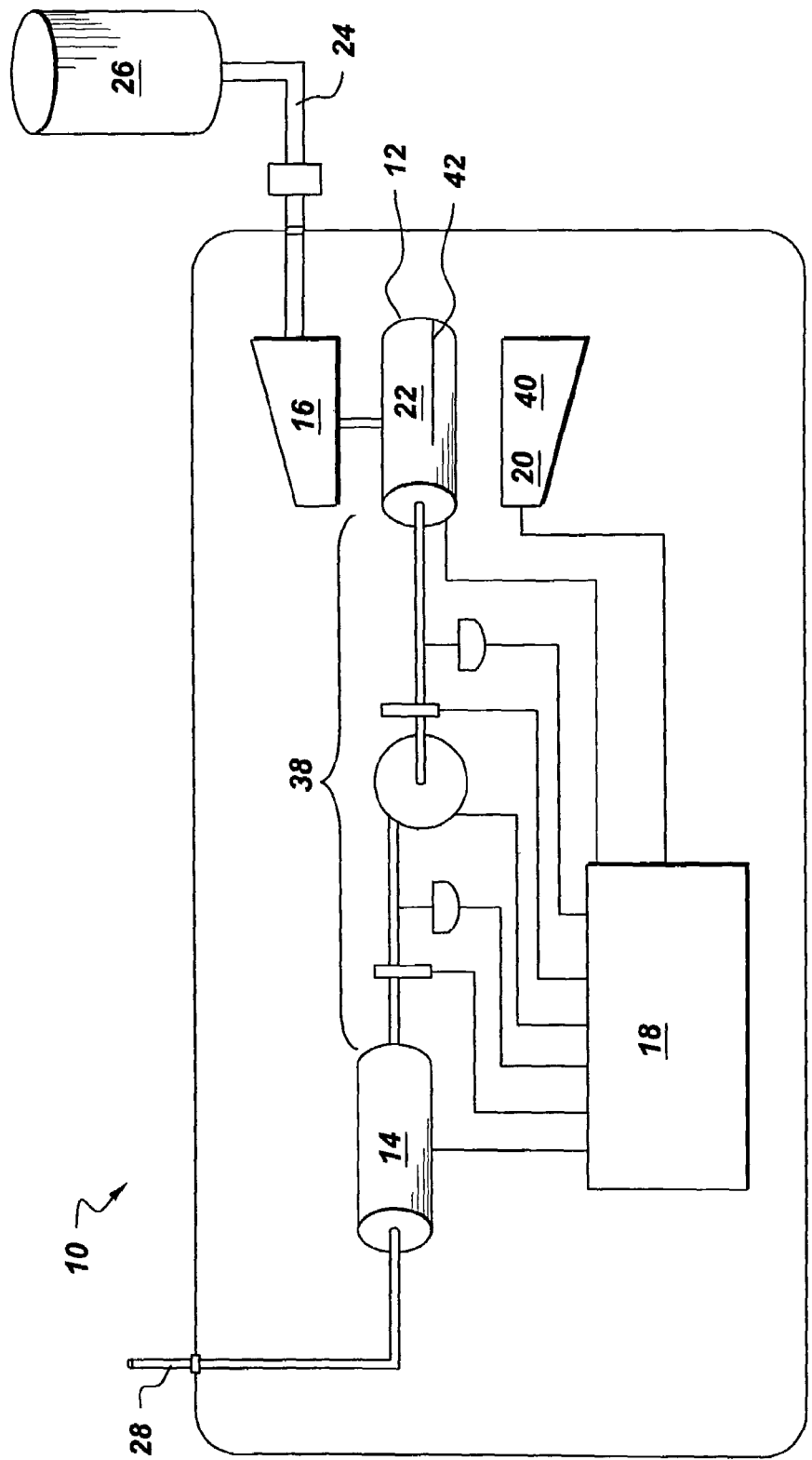
FIG. 1 schematic diagram of an appliance according to the present invention.

In the following description, like reference characters designate like or corresponding parts throughout the several views shown in the figures. It is also understood that terms such as "top," "bottom," "outward," "inward," and the like are words of convenience and are not to be construed as limiting terms.

Referring to the drawings in general and to FIG. 1 in particular, it will be understood that the illustrations are for the purpose of describing a preferred embodiment of the invention and are not intended to limit the invention thereto. As best seen in FIG. 1, an appliance, generally designated 10, is shown constructed according to the present invention. The appliance 10 includes a converter 14, a hydrogen storage container 12, a charger 16, a discharger 20, an exhaust 28, and a controller 18. The hydrogen storage container 12 includes a nanostructured material 22 such as, for example, a carbon-based material.

The converter 14 is capable of transforming the energy produced by the consumption of hydrogen to any one of heat energy, mechanical energy, electrical energy, and combinations thereof. Thus, without limitation, it is contemplated that the converter may be any one of a propulsive system, power generation system, thermal management system, and combinations thereof. The propulsive system may include, without limitation, a combustion-based system such as, for example, an internal combustion engine or a turbine; a chemical-based system such as, for example, a fuel cell-based system; and combinations thereof. Similarly, the thermal management system may include, without limitation, a combustion-based system such as, for example, an internal combustion engine or a turbine; a chemical-based system such as, for example, a fuel cell-based system; and combinations thereof. The fuel cell-based system may be a hydrogen-oxygen electrical generator. Further, the thermal management system may include, without limitation, a heating system such as, for example, a combustion-based system or a hydrogen-oxygen electrical generator; a cooling system such as, for example, a direct cooling system that takes advantage of the excellent thermal conducting properties of hydrogen or a hydrogen-oxygen electrical generator that in turn powers a refrigeration system; and combinations thereof.

Turning now to the hydrogen storage container 12, it will be appreciated that such a container 12 possesses a configuration that makes it refillable. Also, it will be appreciated that appliance 10 has a reconstituted hydrogen supply line 38 to provide the hydrogen to the converter 14. Shown in FIG. 1 as part of the reconstituted hydrogen supply line 38 (and not numbered in FIG. 1) is a pump having a pressure gage and mass flow meter on both the suction side and outlet side of the pump. In one form, the container 12 is interchangeable. That is when the hydrogen is exhausted to a level insufficient to supply appliance 10; the exhausted container 12 of appliance 10 is removed and replaced with a full container 12. Then, the exhausted container 12 can be filled using a hydrogen supply external to the appliance 10. In another form, the container 12 resides within the appliance 10 and a gaseous hydrogen supply is provided to the container 12 for refilling while still within the appliance 10. In either form, the hydrogen storage container 12 is pressurizeable at any one of cryogenic temperatures, elevated temperatures, and cryogenic through elevated temperatures. A reconstituted hydrogen supply line 38 provides reconstituted hydrogen to the converter 14 from the hydrogen storage container 12. As shown in FIG. 1, the reconstituted hydrogen supply line 38 may include a number of subcomponents that allow the reconstituted hydrogen to be supplied to the converter 14 at a pressure and mass amount to operate the converter 14 effectively. For example, if the appliance 10 is a vehicle, and the converter 14 is an internal combustion engine, the reconstituted hydrogen supply line 38 includes temperature and pressure sensors and mass flow meters before a pump and the same after the pump to facilitate the delivery of reconstituted hydrogen at mass flow rates to the internal combustion engine to permit acceleration of vehicle comparable to corresponding fossil based vehicles.

The charger 16 is capable of assisting with the storage of the substantially carbon-free gaseous hydrogen in a condensed state. To that end, the charger 16 further includes a conditioner (not shown) for facilitating the charging the nanostructured material 22 with hydrogen. The conditioner may include any of a number mechanisms that result in the storage of hydrogen. For example, the conditioner may condition (1) the gaseous hydrogen to a prescribed state such as, for example, a prescribed temperature and pressure; (2) the nanostructured material 22 to a prescribed state such as, for example prescribed temperature and pressure; and (3) both (1) and (2). To that end, the conditioner may include any one of a cooler, a pressurizer, and a cooler and pressurizer. It is contemplated that the cooler is capable of operating over a broad range of temperatures (e.g., between about $-50°$ C. and $15°$ C.). Also, it is contemplated that the pressurizer is capable of operating over a broad range of pressures including subatomopheric, atmospheric, superatmospheric, and hyperatmospheric (e.g., between about 20 torr and 1000 pounds per square inch absolute (psia)). It will be appreciated that the charger 16 communicates hydrogen to the hydrogen storage container 12 that is provided by a hydrogen supply line 24 communicating with a hydrogen supply 26.

The discharger 20 assists with the liberation the condensed hydrogen from the nanostructured material 22 to provide gaseous hydrogen to the converter 14. The discharger 20 includes a restoring mechanism capable of controllably releasing condensed hydrogen. As the condensed hydrogen is spatially distributed throughout the nanostructured material 22 that in turn may be spatially distributed throughout the storage container 12, the restoring mechanism is capable of selectively communicating with the nanostructured material 22 to effect the transformation of condensed hydrogen to gaseous hydrogen in a manner that provides the gaseous hydrogen to the converter 14 in a state (e.g., temperature and pressure) and a mass flow rate prescribe to permit the appliance 10 to perform effectively. As discussed above, the reconstituted hydrogen supply line 38 may actively participate in providing the gaseous hydrogen to the converter 14. The restoring mechanism may includes a heating mechanism that provides heat by any one of chemical heating, resistive heating, radio frequency heating, microwave heating, electrical heating, electromagnetic heating, and combinations thereof. The restoring mechanism may further include a subcontroller 40. Also, the restoring mechanism further may include at least one sensor 42 such as, for example, any one of a temperature sensor, a pressure sensor, a partial pressure sensor, chemical sensor, and a flow sensor. With respect to the sensor 42 that communicates with controller 40, it be a temperature sensors that extend into or communicate spatially with the hydrogen storage container 12 in a way to facilitate the heating of the hydrogen storage container 12 to selectively and progressively release the hydrogen from the container in a manner and at a rate to supply the converter 14 at appropriate flow rates.

Figure 2:
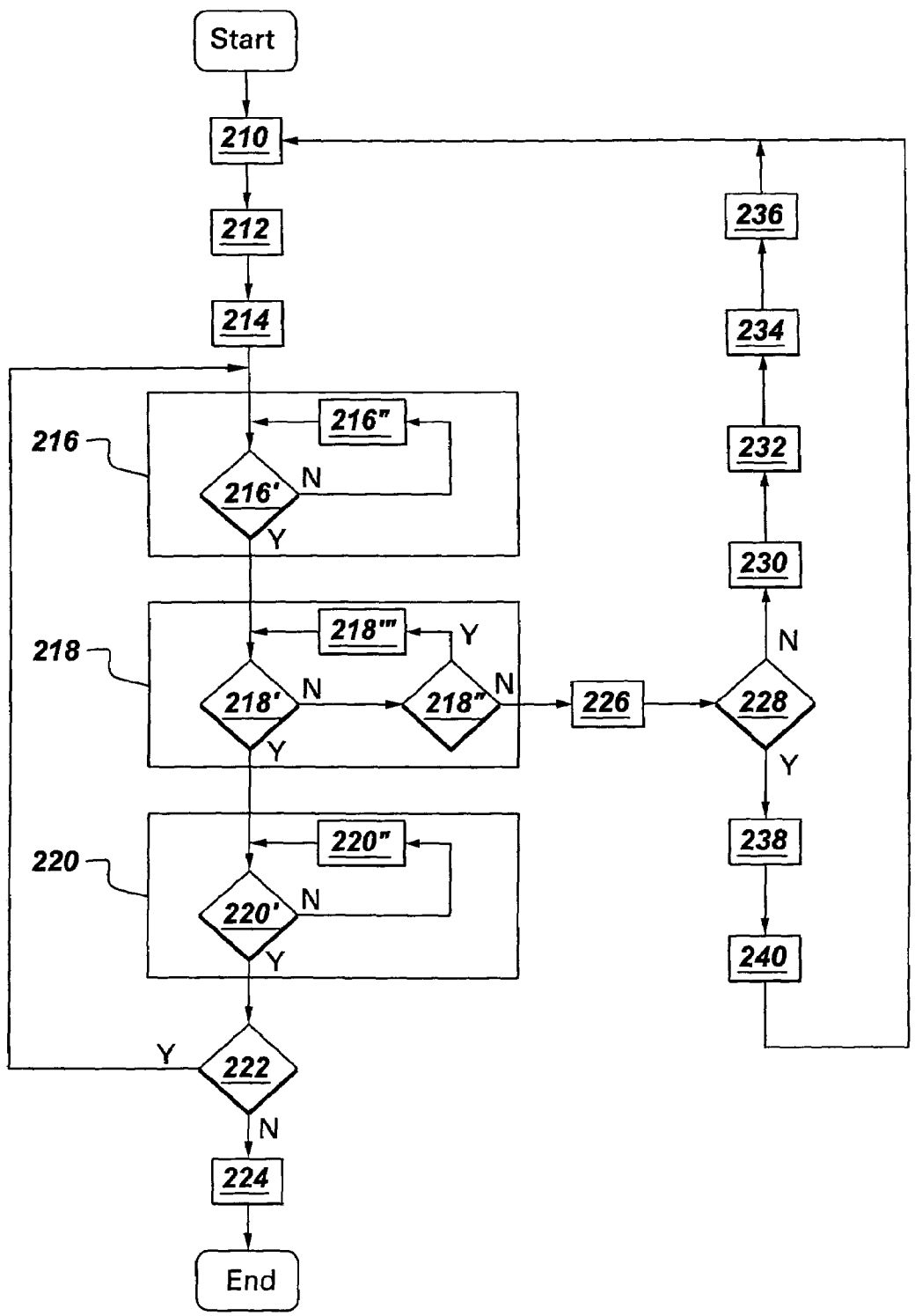
FIG. 2 is a block diagram illustrating the operation of the appliance of FIG. 1.

FIG. 2 illustrates a method 200 of operation of an appliance 10 of the present invention, including the following steps:

Step 210, Initiate Reconstituted Hydrogen Supply line 38 Operation: In this step, the appliance 10 is prepared for operation by initiating the reconstituted hydrogen supply line 38, for example, by:
- initiating the pump operation;
- measuring the pump suction side pressure;
- determining the pump suction side reconstituted hydrogen mass;
- measuring the pump exit side pressure; and
- determining the pump exit side reconstituted hydrogen mass to know that a sufficient reconstituted hydrogen mass flow rate can be attained to operate the converter 14.

Step 212, Initiate Hydrogen Container 12 Operation: In this step, the appliance 10 is prepared for operation by using the reconstituted hydrogen supply line 38 parameters to initiate hydrogen container 12 operation.

Step 214, Initiate Convener 14 Operation: In this step, the appliance 10 operation is initiated by initiating the operation of the converter 14.

Step 216, Converter 14 Operational: In this step, the controller 18 compares the operating parameters with the set point parameters of the converter 14, decision box 216'. The operating parameters of converter 14 are adjusted to be within the set point value limits so that the appliance 10 continues operating, operation box 216".

Step 218, Hydrogen Container 12 Operational: In this step, the controller 18, based on the operating parameters of the converter 14 defines the operating parameters of the discharger 20 communicating with the hydrogen container 12. Then controller 40 of the discharger 20 compares the operating parameters of the discharger 20 with the set point parameters, decision box 218'. To the extent that the operating parameters of the discharger 20 can be adjusted to be within the set point value limits the appliance 10 continues operating, operation box 218'". Also, controller 40 queries to determine the amount of hydrogen available in hydrogen container 12, decision box 218". If hydrogen container 12 is empty, the controller 40 relays that information to the controller 18 that in turn switches the appliance 10 to Step 226, Stop Appliance 10 Operation.

Step 220, Reconstituted Hydrogen Supply line 38 Operational: In this step, the controller 18, based on the operating parameters of the converter 14 defines the operating parameters of the reconstitutes hydrogen supply line 38 communicating with the hydrogen container 12. Then controller 18 compares the operating parameters of the reconstituted hydrogen supply line 38 with the set point parameters, decision box 220'. The operating parameters of reconstitutes hydrogen supply line 38 are adjusted to be within the set point value limits so that appliance 10 continues operating, decision box 220".

Step 222, Continue Appliance 10 Operation: In this step, the controller 18 is instructed as to whether the operation of appliance 10 is to be continued. If the appliance 10 is to continue operating, then the controller 18 is directed to go through Steps 216 through 220 otherwise the controller 18 switches the appliance 10 to Step 224, Appliance Shut Down.

Step 224, Shut Down Appliance 10: In this step, the controller 18 instructs appliance 10 to shut down.

Step 226, Shut Down Appliance 10 for Hydrogen Container 12 Refilling: In this step, the controller 18 instructs appliance 10 to shut down to permit the refilling or exchange of hydrogen container 12 for refueling.

Step 228, Replaceable of Refillable Hydrogen Container 12: In this step, the controller 18 determines the steps for refueling hydrogen container 12 of appliance 10. If the hydrogen container 12 is refuelable, refueling is done by switching to Step 230, Engagement of Hydrogen Supply 26 to Hydrogen Containers 12 otherwise, the refueling is done by switching to Step 238, Remove of Spent Hydrogen Containers 12 as the hydrogen container 12 is interchangeable.

Step 230, Engage Hydrogen Supply 26 to Hydrogen Containers 12: In this step, the hydrogen supply 26 is attached to the appliance 10 to provide gaseous hydrogen to the hydrogen container 12 via hydrogen supply line 24 and conditioner 16.

Step 232, Commence Operation of Conditioner 16: In this step, the operation of the conditioner 16 is initiated to prepare the gaseous hydrogen and/or the nanostructured material 22 within hydrogen container 12 so that the gaseous hydrogen can be stored in a condensed state.

Step 234, Provide Gaseous Hydrogen to Conditioned Nanostructured Material 22 within Hydrogen Container 12: In this step, conditioned gaseous hydrogen is provided to the nanostructured material 22 and/or gaseous hydrogen is provided to the conditioned nanostructured material 22 within hydrogen container 12 to fill the hydrogen container 12.

Step 236, Shut Down Conditioner 16 and Disengage of Hydrogen Supply 26 from Hydrogen Container 12: In this step, controller 18 directs the hydrogen gas supply 26 to be disengaged and the conditioner 16 to be shut down.

Step 238, Remove of Spent Hydrogen Container 12: In this step, the spent hydrogen container 12 is removed from the appliance 10.

Step 240, Replace Full Hydrogen Container 12: In this step, a full hydrogen container 12 is replace into the appliance 10.

The controller 18 and controller 40 are a commercially available controller with a plurality of inputs and outputs that meet the requirements of the peripherals. The controller 18 and controller 40 may be a micro-controller or a PC with appropriate hardware and software. Details concerning controllers that may be used in appliance 10 for controller 18 and controller 40 are discussed in, for example, U.S. Pat. Nos. 5,980,078; 5,726,912; 5,689,415; 5,579,218; 5,351,200; 4,916,600; 4,646,223; 4,344,127; and 4,396,976, the entire disclosure of each being incorporated herein by reference.

Referring now back to the nanostructured material 22. In a preferred embodiment, the carbon-based nanostructured material 22 includes a metal capable of acting as both a seed for the formation of the nanostructured material and a facilitator for promoting the storage of hydrogen in the condensed state. The nanostructured material 22 is capable of reversibly storing hydrogen. It would be preferred that such a material would store at least about 7 weight percent and up to about 14 weight percent hydrogen on the basis of the sum of carbon plus hydrogen. The metal includes at least one transition metal. The metal may include non-stoichiometric transition metal combinations. Examples of a metal include any one of magnesium, titanium, iron, nickel, cobalt, mixtures thereof, alloys thereof, and combinations thereof. Such metals can be produced in nanostructured sizes from the decomposition of metal carbonyls as employed in the high-pressure CO conversion (HiPCO) synthesis method or by supersaturation of precursor (or metal) vapors or even by supersonic expansion, typically employing a temperature history. The metal has a size less than about 100 nanometers, and may be less than about 10 nanometers, and even less than one nanometer. In promoting the storage of hydrogen in the condensed state, the metal may promotes any one of (1) the Van der Waals' bonding of the hydrogen to the nanostructured material to facilitate storage in a condensed state; (2) the covalent bonding of hydrogen to the nanostructured material to facilitate storage in a condensed state; and (3) the Van der Waals' bonding and the covalent bonding of hydrogen to the nanostructured material to facilitate storage in a condensed state.

Although any of the variety of carbon-based nanostructured materials are contemplated, a multiple-walled carbon nanotube may provide hydrogen storage capacity advantages. Among the variety of contemplated multiple-walled carbon nanotubes are any one of a zigzag structure, a chiral structure, an armchair structure and combinations thereof. Counterintuitive to providing hydrogen storage capacity advantages, it is believed that a single-walled carbon nanotube may provide increased hydrogen storage capacity over multiple-walled carbon nanotubes. Among the variety of contemplated single-walled carbon nanotubes are any one of a zigzag structure, a chiral structure, an armchair structure, and combinations thereof. Yet another contemplated carbon-based nanostructured material is a platelet structures carbon-based material. When metal nanoparticles are included, the carbon-based material may be a graphite encapsulated metal. For example, U.S. Pat. No. 5,965,267 issued in the name of Nolan et al. on Oct. 12, 1999 and the article by W. Teunissen et al. entitled "The Structure of Carbon Encapsulated NiFe Nanoparticles" in Journal of Catalysis 204, 169-174 (2001). The entire disclosure of each being incorporated herein by reference.

For the purpose of this application, non-limiting examples of carbon nanostructures include those selected from carbon nanotubes, carbon fibrils, carbon nanoshells and carbon nanofibers. Typically, the nanostructure will be substantially graphitic, and in the case of carbon nanofibers the interstices are a function of the distance between graphitic platelets of about 0.335 nm. It is to be understood that the terms "carbon filaments," "carbon whiskers," "carbon nanofibers," and "carbon fibrils" are sometimes used interchangeably by those having ordinary skill in the art.

Carbon nanotubes, other than those which are referred to as carbon fibrils, are typically of the fullerene type. Fullerene structures are described in an article by M. S. Dresselhaus et. al. entitled "Fullerenes," on pages 2087-2092 in Journal of Materials Research., Vol. 8, No. 8, August 1993. The entire disclosure of which is incorporated herein by reference. Fullerenes are Cn cage molecules built from a collection of hexagonal and pentagonal faces. The C60 fullerenes are typically referred to as "buckminsterfullerenes" or simply "buckyballs." C60 derived tubules can be defined, in simplest terms, by bisecting a C60 molecule at the equator and joining the two resulting hemispheres with a cylindrical tube one monolayer thick and with the same diameter as C60. Carbon nanotubes can generally be defined as hollow structures comprised of substantially parallel graphite layers aligned at distances of about 0.335 nm to 0.67 nm from each other.

Carbon nanoshells, also referred to as carbon nanoparticles, are typically polyhedral-layered structures comprised of multiple layers of carbon forming substantially closed shells around voids of various shapes and sizes. Such materials are described in an article entitled "Encapsulation Of Lanthanum Carbide In Carbon Nanotubes And Carbon Nanoparticles," by Mingqui Liu and John M. Cowley; Carbon, Vol. 33, No. 2, pages 225-232; Elsevier Science Inc., 1995. The entire disclosure of which is incorporated herein by reference. For purposes of the present invention, a carbon nanoparticle is formed from a nucleating metal nanoparticle, wherein the carbon particle is capable of absorbing hydrogen. Examples of metals are lanthanum and magnesium. The metal is incorporated into the void, or hollow inner core of the carbon nanoshell.

Graphite-encapsulated metal nanoparticles (GEM) and metal nanoparticles have been described by Van der Waal et. "Directed Synthesis of Metal-Catalyzed Carbon Nanofibers and Graphite Encapsulated Metal Nanoparticles". J. Phys. Chem B2000, 104, 11606-11611. The entire disclosure of which is incorporated herein by reference.

Rodriquez et al, U.S. Pat. No. 5,653,951, the entire disclosure of which is incorporated herein by reference, discloses a composition comprised of a layered nanostructure having some regions of crystallinity with interstices in which hydrogen are stored. The layered nanostructure is a carbon nanostructure selected from the group consisting of carbon nanotubes, carbon fibrils, carbon nanoshells, and carbon nanofibers.

The current methods of synthesizing single-wall and multi-wall nanotubes (SWNT and MWNT) include laser processing (ablation/solidification), plasma processing, and CVD. Several examples are given below. Carbon nanostructures are formed by dehydrogenating and graphitizing organic polymer filaments, and by vaporizing a hydrocarbon and then contacting a suitable metal catalyst using a carrier gas. This latter method is generally referred to as chemical vapor deposition (CVD). In a variation on this method, Ying Wang, in U.S. Pat. No. 5,543,378, the entire disclosure of which is incorporated herein by reference, describes a method for making carbon nanostructures, wherein the suitable metal catalyst is also vaporized. The carbon nanostructures are worm-like in appearance. The method utilizes an electric arc current through a positive and negative electrode, the negative electrode comprising a first carbon rod and the positive electrode comprising a second carbon rod, the second carbon rod having a hole therein filled with PdO paste; vaporizing the PdO-filled carbon rod; and depositing the carbon nanostructure having a palladium crystallite encapsulated therein at a tip of the negative electrode. The electric arc provides very high temperatures to vaporize the palladium, and provides a reducing current. Lee et al., in U.S. Pat. No. 6,350,488, the entire disclosure of which is incorporated herein by reference, discloses a mass synthesis method of forming CNT's on a metal catalyst layer over a substrate. The metal catalyst layer is etched to form isolated nano-sized catalytic metal particles and carbon nanotubes, which are vertically aligned over the substrate, grow from the nano-sized metal particle by thermal chemical vapor deposition (CVD). Methane gas is supplied to form the carbon and ammonia is supplied forming a metal etching gas. The carbon structures grow on the etched metal. Plasma and acid metal etching are also disclosed.

A method of producing the nanostructured materials 12 includes mixing of carbon nanotubes, fullerenes, graphitic structures and metal nanoparticles (including GEMS) via gas phase synthesis. The synthesis may be a continuous vapor deposition (CVD) process that is suitable for production of relatively large quantities of the mixture of the nanostructured materials 12. For example, in a first stage of the synthesis, a metallic material that is a precursor to a metal nanoparticles intermediate (e.g., a metal oxide) is introduced into an oxidizing zone (the composition of the atmosphere of the zone is at an oxidizing potential with respect to metallic material) of a combustion chamber including an oxidizing flame to forming hot products-of-combustion gases and metal oxides. In a second stage of the synthesis, the hot products-of-combustion gases and metal oxides are introduced onto a cooler reducing zone (the composition of the atmosphere of the zone is at reducing potential with respect to metallic material) having a reducing flame therein forming reduction products comprised of products-of-partial combustion gases, metal nanoparticles, substantially elemental carbon, and small molecules of carbon. In a third stage, the reduction products are quenched and deposited on a substrate forming nanostructured materials 12 comprised of mixtures of carbon nanotubes, fullerenes, metal nanoparticles, and graphite-encapsulated metal particles.

The metal incorporated into the nanoparticles is selected for its performance as a multifunction catalyst. As a multifunctional catalyst, the metal capable of acting as both a seed for the formation of the nanostructured material 12 and a facilitator for promoting the storage of hydrogen in the condensed state thereby augmenting the storage of hydrogen in the mixture of nanostructured materials 12. The method of injecting the metallic material is selected as appropriate for the properties of the precursor, which may be gaseous, liquid or solid. For example, inorganometallic and/or organometallic materials that can be vaporized by flash evaporation may be introduced into the flame, typically with the aid of an inert gas carrier. Metallic materials having a very high boiling point are preferably nebulized, for instance, using ultrasonic nebulization in a pre-chamber, and the resulting mist is conveyed into the oxidizing flame via an inert gas carrier at an elevated, yet lower than the decomposition, temperature. Liquid metallic materials can be transported into the oxidizing flame using bubbler vaporization. There are a number of precursors that are solids that vaporize by sublimation. These metallic materials can be introduced in the gaseous state by a carrier gas. The carrier gas under the correct conditions need not be an inert gas, but can also be a fuel gas, such as hydrogen, which is maintained at elevated temperatures lower than the precursor decomposition temperature.

Suitable metal materials include alkaline earth metals and transition metals. Metallic materials having an organic ligand (e.g. organometallic materials), where the organic ligand is preferably a relatively small molecule that is not highly ionic. Examples of organometallic materials include ethyl magnesium, magnesium ethoxide, and organometallic complexes such nickel B-ketonenolate. Organometallic materials can also be multi-metallics comprised of two or more metals, such as magnesium aluminum isopropoxide. Additionally, the precursors can be inorganometallic materials. An example of an inorganometallic material is nickel hydroxide. Since the metal is a multifunctional catalyst, a combination of multiple precursors may be used for the catalyst formation (e.g. bimetallic catalysts).

In the first stage of the combustion chamber, the precursor is introduced into the oxidizing flame, which is fuel-lean. The oxidant is preferably molecular oxygen, versus air or nitrous oxide, to minimize the formation of oxides of nitrogen. The first stage strips off the organic portion and generally results in the formation of an intermediate such as a metal oxide, which subsequently tranforms into solid nanoparticles, via a supersaturation/condensation process with cluster formation and particle growth. Alternatively, a fuel-rich CO (carbon monoxide) flame may be used in the first stage. The only products from such a flame will be unburnt CO and $CO_2$, considered to be inert. In this latter embodiment, the flame is dry and water cannot be formed and therefore the poisoning or interaction with water of the metal nanoparticles is avoided. Since a $CO/O_2$ dry flame is also hotter than a hydrocarbon flame, precursors otherwise hard to thermally decompose can be utilized to grow the metal nanoparticles from gaseous, liquid or solid precursors (e.g., transition metal halides, such as, those based on chlorine and/or fluorine. Applicant believes iron halides such as, for example, iron fluorides (e.g., $FeF_2$ and $FeF_3$) exemplify such halides. Also, other halides having low vapor pressures and high fusion temperatures may be appropriate.). The hot gases of the first stage pass into the second stage. To cool the second stage, a cooling additive is preferably introduced. The cooling additive can be an inert gas, such as a argon or a mixture of gases, or a relatively inert gas composition selected from the group consisting of nitrogen, water, water vapor, carbon dioxide, or a combination of gases. Also added in the second stage is a fuel and an additional oxidant if needed, wherein the overall stoichiometry of all components is a fuel-rich reducing flame. The preferable fuel is a conventional gas burner fuel, such as natural gas or propane, or an unconventional fuel such as carbon monoxide. Particularly, if a fuel-rich carbon monoxide flame is used in the first stage, then in the second stage of the flame, additional carbon monoxide will reduce the high flame temperature to carbon growth conditions (e.g. between about 700° C. and 1200° C. from 2000° C.) while increasing the partial pressure of the fuel, in this case carbon monoxide. This will improve the yield of the process, which remains water-free and therefore pure.

In the fuel-rich flame, nascent metal nanoparticles serve as incipient nucleation centers for nanotube formation producing nanotube growth and deposition onto the substrate. The deposition substrate of the third stage is relatively cold and rapidly quenches nascent nanotubes vapors being formed in the second stage. In the third stage, there is vapor deposition on the substrate. The metal nanoparticles and the nascent nanotube vapors pass onto and over the substrate and collect and grow thereon. The products-of-combustion and cooling gases move on unabated. The predominate particle size and the morphology of the metal nanoparticles are highly dependent upon the residence time of the particle in the flame and the flame temperature history for both preceding stages. The temperature history can be controlled by varying stoichiometries, flowrates, and staging. The characteristics of the nanoparticles are controlled in the second stage, and then essentially frozen from further change by the substrate, therein preserving the morphology of agglomerates, particle sizes, and morphological characteristics developed in the reducing flame.

Low pressure processing minimizes agglomeration, especially if methane is utilized in the fuel-rich stage of the process. For example, Applicant believes that pressures less than or equal to about 500 torr, and even less than or equal to about 200 torr, would provide desirable results. The lower pressure process has a lower degree of agglomeration, and thereby reduces the need for a deroping purification process by synthesis in the Knudsen (or free-molecular) regime. The second stage of the method terminates aligned and displaced from the target vapor deposition surface of the substrate. In the third stage, a substrate is a disk, which may or may not rotate, depending on the flame synthesis conditions required. A thermal gradient is then formed between the second stage and the substrate, and the resulting thermophoretic forces act upon the particles and nanotubes, accelerating them towards the substrate and therefore enhancing the deposition process. In addition, a rotating disk can serve as a "von Karman pump," forcing a uniform boundary layer to form above the substrate, provided the appropriate rotation is imposed upon the disk. The thermophoretic forces and rotation insure the unidimensional variation of flow and thermal conditions, therefore uniformity of synthesized particles and metal/nanotubes mixtures.

A system for the continuous vapor deposition synthesis of a mixture of nanostructured materials 12 and metal nanoparticles is comprised of an inline flame combustion chamber having an oxidizing zone and a cooler reducing zone terminating with an exhaust exit, and is further comprised of a vapor deposition substrate, such as a rotating disk, that is relatively cold. The oxidizing zone has a burner with a fuel input line, an oxidant input line, and a precursor input line, or a partially premixed system. The reducing zone has a burner with a fuel input line, an oxidant input line, and a coolant additive input line. The exhaust exit of the combustion chamber is aligned over the disk. The precursor input line conveys an inert gaseous carrier (or other gas such as $H_2$) that transports the precursor as a vapor or an ultrasonic nebulized mist. The coolant additive input line transports an inert gas, such as a argon or a mixture of gases, or a relatively inert gas selected from the group consisting of nitrogen, hydrogen, water, water vapor, carbon monoxide and carbon dioxide or a combination of gases, if the system is not employing a dry $CO/O_2$ fuel rich flame in the first stage. If the latter is used, then metal carbonyls and halides can be used as precursors for forming the metallic nanoparticles required to grow carbon nanostructures and $H_2$ is not to be used in order to avoid water poisoning of the seed particles.

The system may be comprised of a combustion chamber having two zones, an oxidizing zone and a reducing zone, if a hydrocarbon is used as fuel; or 1 oxidizing zone in fuel-rich diffusion or partially premixed conditions using CO/O2 mixture and a "dilution zone" where more CO is mixed with the products to form a colder and richer $CO/CO_2$ stream.

(1) For the first case, the oxidizing zone has a fuel-lean burner, and the reducing zone has a fuel-rich burner. Both burners use a gaseous fuel and an oxidant. The fuel in burner may be natural gas. The precursor is injected into burner. A cooling additive is injected into burner. The precursor is vaporized and oxidized in the oxidizing zone.

(2) For the second case, where $CO/O_2$ is used in first stage and fuel-rich conditions, all the oxidant is consumed forming $CO_2$ and additional fuel (CO) is mixed with the products. The precursor can be introduced into the hot flame (up to about 2500° C., theoretically) for thermal decomposition and metal particle growth. Downstream, additional CO is added for increasing the fuel partial pressure (for the Boudouard reaction $2CO = C+CO_2$ equilibrium shift). The carbon nanostructures will grow on the catalyst i.e. metal nanoparticles formed and grown in the first stage.

In the reducing zone, the precursor is converted into a metal nanoparticles that are formed as the carbon starts surrounding the metal, which acts as a nucleating catalyst for the process. The metal particles are suspended by the equilibrium of drag, inertial, thermophoretic and gravitational forces in the burning combustion gases. Nascent carbon nanotubes, fullerenes, graphite encapsulated metals and carbon fibrils are also formed. The products-of-combustion gases and the nanostructures exit the combustion chamber onto a rotating disk, and spiral outward. The metal nanoparticles deposit on the disk and catalyze the growth of nanotubes, etc., so that the nanostructures become much larger. Some nanostructures have a "worm-like" appearance. The CVD synthesis process is continuous, and as the mixture of nanotubes, fullerenes, and metal nanoparticles form, they are scraped off the disk, creating a surface for further accumulation. The synthesis is suitable for production of large quantities of nanostructure materials 12. Alternatively, an electrostatic system can be utilized for collection.

While the production process has been described in terms of a single first stage supplying oxidation vapors comprised of hot products-of-combustion gases and metal oxides to the second stage; in fact, multiple first stages could be employed as sources for the metal nanoparticles intermediate. Also, in the third stage, where the reduction products are quenched and deposited on a substrate forming nanostructured materials 12, the quenching process could be augmented through the addition of external cooling. A variation on that version is the inclusion of carbon nanoparticles generated by plasma hydrocarbon cracking to augment the process and change the composition of the nanostructured materials 12. It is known that plasma carbon (carbon black, graphite, and nanoparticles) can be produced using continuous plasma electrothermic processing of carbonaceous feedstocks such as methane, ethylene, styrene, and pyrolysis fuel oil. The type of plasma carbon formed is dependent on the feedstock. It is intended that all suitable modifications and variations as come within the scope of the appended claims and their equivalents are covered by the present invention.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention. It should be understood that all such modifications and improvements have been deleted herein for the sake of conciseness and readability but are properly within the scope of the following claims.

The invention claimed is:

1. An appliance comprising:
   (a) a converter capable of using a substantially carbon-free hydrogen;
   (b) a hydrogen storage container including a nanostructured material capable of storing the substantially carbon-free hydrogen in a condensed state, the container including:
      (i) a carbon-based nanostructured material and
      (ii) a metal acting as both a seed for the formation of the nanostructured material and a facilitator for promoting the storage in the condensed state of the substantially carbon-free gaseous hydrogen provided to the storage container, the metal having a particle size less than about 100 nanometers;
   (c) a charger capable of facilitating the storage in the condensed state of a substantially carbon-free gaseous hydrogen provided to the storage container; and
   (d) a discharger for liberating the condensed substantially carbon-free hydrogen from the nanostructured material of the hydrogen storage container so as to be available for use in the converter.

2. The appliance according to claim 1, further including a controller for regulating the cooperation of the converter, the charger, and the discharger.

3. The appliance according to claim 1, further including an exhaust.

4. The appliance according to claim 1, wherein the converter is for propulsion.

5. The appliance according to claim 4, wherein the propulsion converter is combustion-based.

6. The appliance according to claim 5, wherein the combustion-based propulsion converter is an internal combustion engine.

7. The appliance according to claim 5, wherein the combustion-based propulsion converter is a turbine.

8. The appliance according to claim 4, wherein the propulsion converter is chemical-based.

9. The appliance according to claim 8, wherein the chemical-based propulsion converter is a fuel cell-based system.

10. The appliance according to claim 1, wherein the converter is a power generation system.

11. The appliance according to claim 10, wherein the power generation system is a combustion-based system.

12. The appliance according to claim 11, wherein the combustion-based system is a turbine.

13. The appliance according to claim 10, wherein the power generation system is a fuel cell-based system.

14. The appliance according to claim 13, wherein the fuel cell-based system is a hydrogen-oxygen electrical generator.

15. The appliance according to claim 1, wherein the converter is a thermal management system.

16. The appliance according to claim 15, wherein the thermal management system is a heating system.

17. The appliance according to claim 16, wherein the heating system is a combustion-based system.

18. The appliance according to claim 16, wherein the heating system is a hydrogen-oxygen electrical generator.

19. The appliance according to claim 15, wherein the thermal management system is a cooling system.

20. The appliance according to claim 1, further including a hydrogen gas supply communicating with the charger.

21. The appliance according to claim 1, wherein the charger further includes a conditioner for facilitating hydrogen charging of the nanostructured material.

22. The appliance according to claim 21, wherein the conditioner is a cooler.

23. The appliance according to claim 21, wherein the conditioner is a pressurizer.

24. The appliance according to claim 1, wherein the discharger includes a restoring mechanism capable of controllably releasing condensed hydrogen to provide gaseous hydrogen to the converter.

25. The appliance according to claim 24, wherein the restoring mechanism includes a heating mechanism.

26. The appliance according to claim 25, wherein the heating mechanism provides heat by any one of chemical heating, resistive heating, radio frequency heating, microwave heating, electrical heating, electromagnetic heating, and any combination thereof.

27. The appliance according to claim 24, wherein the restoring mechanism further includes a subcontroller.

28. The appliance according to claim 24, wherein the restoring mechanism further include at least one sensor.

29. The appliance according to claim 28, wherein the at least one sensor includes any one of a temperature sensor, a pressure sensor, a partial pressure sensor, chemical sensor, and a flow sensor.

30. The appliance according to claim 1, wherein the metal comprises an organometallic material.

31. The appliance according to claim 30, wherein the organometallic material comprises one selected from the group consisting of a multi-metallic material, ethyl magnesium, magnesium ethoxide, an organometallic complex, and a combination thereof.

32. The appliance according claim 31, wherein the multi-metallic material comprises magnesium aluminum isopropoxide.

33. The appliance according to claim 31, wherein the organometallic complex comprises nickel B-ketonenolate.

* * * * *